(12) United States Patent
Gröner et al.

(10) Patent No.: US 11,180,297 B2
(45) Date of Patent: Nov. 23, 2021

(54) PACKAGING FOR RECEIVING A FILLING MATERIAL

(71) Applicant: KAO GERMANY GMBH, Darmstadt (DE)

(72) Inventors: Gregor Gröner, Frankfurt (DE); Peter Lamboy, Darmstadt (DE); Christian Lamboy, Darmstadt (DE)

(73) Assignee: KAO GERMANY GMBH, Darmstadt (DE)

( * ) Notice: Subject to any disclaimer, the term of this patent is extended or adjusted under 35 U.S.C. 154(b) by 45 days.

(21) Appl. No.: 16/474,143

(22) PCT Filed: Dec. 18, 2017

(86) PCT No.: PCT/EP2017/083380
§ 371 (c)(1),
(2) Date: Jun. 27, 2019

(87) PCT Pub. No.: WO2018/122024
PCT Pub. Date: Jul. 5, 2018

(65) Prior Publication Data
US 2019/0344943 A1 Nov. 14, 2019

(30) Foreign Application Priority Data
Dec. 29, 2016 (EP) .................................. 16207345

(51) Int. Cl.
*B65D 53/02* (2006.01)
*B65D 43/16* (2006.01)
(Continued)

(52) U.S. Cl.
CPC ........... *B65D 53/02* (2013.01); *B65D 43/162* (2013.01); *B65D 51/20* (2013.01); *B65D 85/70* (2013.01);
(Continued)

(58) Field of Classification Search
CPC ........ B65D 53/02; B65D 53/00; B65D 51/20; B65D 85/70; F16J 15/025; F16J 15/024;
(Continued)

(56) References Cited

U.S. PATENT DOCUMENTS 1,629,346 A 5/1927 Larson
2,910,209 A * 10/1959 Nelson ................. A61G 17/036
220/378
(Continued)

FOREIGN PATENT DOCUMENTS

CH 651 722 A5 10/1985
CN 204937849 U 1/2016
(Continued)

OTHER PUBLICATIONS

International Search Report dated Feb. 26, 2018, corresponds with International Application No. PCT/EP2017/083380.

*Primary Examiner* — Robert J Hicks
(74) *Attorney, Agent, or Firm* — Norris McLaughlin, P.A.

(57) ABSTRACT

Packaging for receiving a filling material comprises a container therefor, the container comprising a collar for bordering an opening for providing access to the filling material, an undercut running in circumferential direction, a lid for covering the opening in closed state and an elastic gasket for sealing the opening, wherein the gasket comprises a ring body for surrounding the opening, a nose protruding mainly radially from the ring body, wherein the gasket encompasses the undercut for connecting the gasket to the collar in a sealing manner, and a flap protruding mainly radially from the ring body, wherein the flap is adapted to seal the lid in closed state of the lid. The three-dimensional design of the gasket allows a tight sealing as well as an elastic compensation of tolerances, so that a good and cost-efficient sealing of the packaging is enabled.

16 Claims, 3 Drawing Sheets

Figure 1:
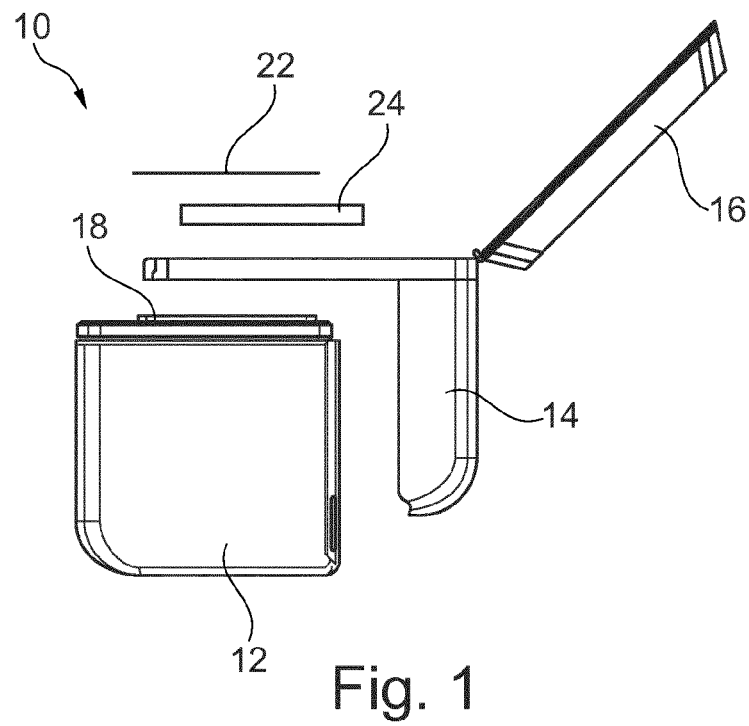

(51) Int. Cl.
    *B65D 51/20*           (2006.01)
    *B65D 85/00*           (2006.01)
    *F16J 15/02*            (2006.01)

(52) U.S. Cl.
    CPC ..... *F16J 15/025* (2013.01); *B65D 2251/0021* (2013.01); *B65D 2251/0093* (2013.01)

(58) Field of Classification Search
    CPC ........ F16J 15/022; F16J 15/021; F16J 43/162; F16J 43/164; F16J 43/16
    USPC ....... 220/378, 806, 804, 801, 796, 836, 810, 220/319, 315; 277/644, 641, 637, 628
    See application file for complete search history.

(56) References Cited

U.S. PATENT DOCUMENTS

| | | | |
|---|---|---|---|
| 3,302,822 A * | 2/1967 | Edwards | B65D 51/18 |
| | | | 220/203.09 |
| 3,433,383 A * | 3/1969 | Phibbs | B65D 21/086 |
| | | | 220/8 |
| 4,279,353 A | 7/1981 | Honma | |
| 6,817,473 B2 * | 11/2004 | Schwaikert | B65D 41/48 |
| | | | 206/508 |
| 8,511,499 B2 | 8/2013 | Perry et al. | |
| 10,441,053 B2 | 10/2019 | Hong et al. | |
| 2002/0160137 A1 * | 10/2002 | Varma | C08L 53/02 |
| | | | 428/35.7 |
| 2011/0186578 A1 * | 8/2011 | Kawakami | B65D 53/00 |
| | | | 220/378 |
| 2015/0203693 A1 * | 7/2015 | Mestan | C09D 7/48 |
| | | | 428/195.1 |

FOREIGN PATENT DOCUMENTS

| | | |
|---|---|---|
| CN | 105877114 A | 8/2016 |
| FR | 2 387 853 A1 | 11/1978 |
| JP | H-1099125 A | 4/1998 |
| JP | 2005224295 A | 8/2005 |
| KR | 101299487 B1 | 8/2013 |
| WO | 2009/147194 A1 | 12/2009 |

* cited by examiner

PACKAGING FOR RECEIVING A FILLING MATERIAL

This application is the U.S. National Stage of International Application No. PCT/EP2017/083380, filed Dec. 18, 2017, which claims foreign priority benefit under 35 U.S.C. § 119 of European Application No. 16207345.6 filed Dec. 29, 2016 the disclosures of which are incorporated herein by reference.

The invention relates to a packaging by which a filling material can be received and securely transported as well as stored over extended periods of time.

WO 2009/147194 A2 discloses a packaging suitable for storing a hygroscopic powder, wherein an opening of a container for storing the hygroscopic powder can be sealed by means of a metal foil glued to a front face of a collar of the container which borders the opening.

U.S. Pat. No. 8,511,499 B2 discloses a packaging suitable for storing a powder, wherein an opening of a container is sealed by a sealing foil which is pressed against a rim of the opening by means of a collar. The collar is clamped to the container and comprises a flexible gasket connected to the rigid collar. The gasket can be pressed against the rim by means of a lid in closed state for sealing the opening There is a permanent need for a good and cost-efficient sealing of a packaging.

It is an object of the invention providing measures enabling a good and cost-efficient sealing of a packaging. Particularly, it is an object of the invention enabling a sealing that protects the filling material for environmental influences, like humidity, particularly after the disposal of a sealing foil during the first removal of a part of the filling material.

The solution of this object is provided according to the invention by a packaging according to the features of claim 1. Preferred embodiments of the invention are given by the dependent claims and the following description, which can constitute each solely or in combination an aspect of the invention.

According to the invention a packaging for receiving a filling material is provided comprising a container for storing the filling material, wherein the container comprises a collar for bordering an opening for providing access to the filling material, wherein the collar comprises an undercut running in circumferential direction, a lid for covering the opening in closed state and a gasket made from an elastic material for sealing the opening, wherein the gasket comprises a ring body for surrounding the opening, a nose protruding mainly radially from the ring body, wherein the gasket encompasses the undercut by means of the nose for connecting the gasket to the collar in a sealing manner, and a flap protruding mainly radially from the ring body, wherein the flap is adapted to seal the lid in closed state of the lid.

The gasket may provide a moisture-proof sealing with the container via the collar of the container. The nose and/or the ring body may be pressed against the collar along the whole circumference of the collar with a sufficient contact force. Due to the elastic material of the gasket the nose and/or the ring body may be sufficiently deformed for providing the intended contact force. The nose and/or the ring body may be sufficiently stretched or compressed for providing a sufficient corresponding resilient force. The geometry of the gasket can be easily chosen in respect to the geometry of the collar for providing a specific minimum deformation and in turn a definite minimum contact force between the gasket and the collar of the container. This minimum contact force can be guaranteed easily even when low requirements in respect to fabrication tolerances apply. This enables a good and cost-efficient sealing between the gasket and the collar of the container. When the container is closed by means of the lid, the lid contacts the flap of the gasket in the closed state of the lid. The lid may be pressed against the gasket in the closed state so that a sufficient contact pressure, particularly for a moisture-proof sealing, may be provided. The filling material inside the container may be sufficiently protected for environmental impacts, for instance humidity or other influences. The container and the lid provide together with the gasket an enclosed volume for the filling material protected from the environment. The lid may be pressed against the gasket for providing a sufficient sealing. Particularly the lid is pressed against the flap, preferably only against the flap, in the closed state. Due to the elasticity of the flap the flap may be biased and may provide a sufficient resilient force. At the same time the flap may compensate a displacement of the lid relative to the collar of the container and the gasket. The flap may be bent more or less depending on the displacement of the lid and the relative position of each part of the flap to a side wall of the lid. A higher or a lower resilient force may be provided from the flap depending on the distance of the side wall of the lid to the ring body of the gasket at each part of the gasket and the gap between the side wall and the ring body bridged by the flap. Again, a specific minimum contact force of the flap to the lid in the closed state of the lid can be guaranteed at a given position tolerance, which may also associate to a given manufacturing tolerance particularly of the lid. The minimum contact force between the flap and the lid and/or the minimum contact force between the nose and/or the ring body and the collar can be sufficient for providing a specific quality of the sealing, particularly a moisture-proof sealing. The three-dimensional design of the gasket allows a tight sealing as well as an elastic compensation of tolerances, so that a good and cost-efficient sealing of the packaging is enabled. Particularly a sealing force between the lid and the flap in the closed state is provided by the resilient force of the bent flap only. It is not necessary to clamp the flap between two parts, which have to be connected to each other by a further connection assembly. The flap protrudes from the ring body mainly in an unstressed and/or relaxed manner in the opened state of the container, wherein the sealing force between the lid and the flap is provided by bending the flap while the lid is moved into the closed stat. The flap is preloaded in the bent state, so that the bent flat may provide the intended sealing force. Particularly preferred the flap protrudes outwards from the ring body. The lid may be put over the gasket, so that it is prevented to insert the lid into the gasket.

The nose and/or the ring body may contact the collar of the container in a two-dimensional manner so that a large contact area is provided. The sealing effect between the gasket and the collar may be increased. The side wall of the lid may be arranged mainly in parallel to the ring body of the gasket in the closed state of the lid. In the alternate the side wall of the lid may be arranged inclined with respect to the ring body of the gasket in the closed state of the lid.

Particularly the side wall and the ring body may border a mainly funnel-shaped gap between the side wall and the ring body in the closed state of the lid. During the closing movement of the lid the sealing force may increase until its maximum in the closed state. This leads to a convenient closing and opening for a user and enables a tight sealing at the same time. Particularly a top part of the lid may abut the ring body of the gasket so that the ring body provide a stop for the closing movement of the lid. A defined maximum closed state can be provided, when the top part of the lid meets an upper front face of the ring body. Particularly the lid applies a force to the gasket pointing at least with a portion in radial direction so that the lid may press the ring body of the gasket against the collar, preferably when the ring body is provided between the collar and the side wall of the lid in radial direction. Preferably the collar is arranged radially inwards to the ring body of the gasket. In the alternate the side wall of the lid may be arranged radially inwards to the ring body of the gasket, so that the side wall may provide a plug inserted into the gasket and/or the opening. The container, particularly together with the collar, may be produced from a plastic material, particularly by blow molding or by plastic injection molding. The container may be made from a thermoplastic material, particularly polypropylene. The lid may be connected to the container directly or indirectly. Preferably the lid is one-piece with the container and connected to the container via a film hinge. The packaging may be designed further as disclosed in WO 2009/147194 A2 whose content is herewith incorporated as part of the invention.

Particularly a closure part surrounding the collar is connected to the container, wherein the gasket is fastened, particularly clamped, between the collar and the closure part. The frame-like closure part may be mounted after the gasket is arranged around the collar. The gasket may comprise a protruding part protruding radially outwards, which may be arranged between the container and the closure part in axial direction so that a loss-proof connection of the gasket is provided. The gasket may be fastened by means of the closure part due to a positive fit and/or a friction fit. Particularly a press fit is provided between the rigid closure part and the elastic gasket so that the gasket may be deformed by the closure part and provides a corresponding increased sealing force against the collar. Preferably the lid may be centered by means of the closure part in the closed state. If so, the lid may be releasably clamped to the closure part in the closed state, so that the lid is secured against unintentional opening.

Particularly the flap protrudes mainly radially outwards from the ring body, wherein the flap is bent by the lid in the closed state. When the side wall of the lid bends the flap, the flap may contact the side wall in a two-dimensional manner so that a large contact area is provided. A pure line contact may be prevented. The sealing effect between the gasket and the lid may be increased. The lid may comprise a mainly U-shaped cross section comprising a top part and a circumferential side wall protruding from the top part. The lid may cover not only the opening but also the collar and the gasket so that an appealing design of the packaging in the closed state may be provided.

Preferably the ring body comprises a pocket for receiving the flap in the maximum bent state, wherein particularly a contact area of the flap for contacting the lid and an outer lateral area of the ring body outside the pocket are arranged mainly flush in the maximum bent state of the flap. When the flap is pressed into the pocket by means of the closed lid the lid may also meet the remaining ring body, particularly a protruding part of the ring body, and/or the frame-like closure part which fastens, particularly clamps, the ring body and/or the nose to the collar. In this state a further movement of the lid towards the collar at this place may be blocked by the gasket since the compressed material of the gasket finds no place to evade and/or the rigid closure part. A further compression of the gasket at this place may be blocked and a resistance force against a further movement of the lid towards the collar may significantly increase at this place. This leads to a centering effect so that the lid may be centered with respect to the collar. This in turns leads to a more equal bending and/or compression of the flap so that a more equal contact force applies between the lid and the flap ensuring a defined minimum contact force and a minimum sealing quality.

Particularly preferred a contact area of the flap for contacting the lid transits into an upper front face of the ring body. A part of the ring body protruding upwards from the upper end of the flap is prevented. If so, a stop function for blocking a closing movement of the lid can be provided at the level of the upper end of the flap. A protruding part is not necessary for providing the stop function. In the alternate or in addition the stop function may be provided by the closure part and/or protruding part of the gasket protruding radially outwards. The protruding part of the gasket may be arranged below the flap. The dimensions of the gasket as well as the required material for manufacturing the gasket can be kept low.

Particularly the gasket is made from an elastomer material, particularly silicone, thermoplastic elastomer or rubber. Due to this material the gasket can be deformed by means of the closing lid and may provide a sufficient resilient force for providing a tight sealing.

Preferably the gasket comprises a hardness h in Shore A according to DIN ISO 7619-1:2010 at 23° C. of $5 \leq h \leq 90$. This hardness allows a sufficient deforming of the gasket when the lid is closed. At the same time the gasket may provide a sufficient counterforce against the deformation for providing a contact force which leads to a tight sealing.

Particularly preferred the nose transits into a lower front face of the ring body. A part of the ring body protruding downwards from the lower end of the nose is prevented. The dimensions of the gasket as well as the required material for manufacturing the gasket can be kept low.

Particularly the nose protrudes mainly radially inwards from the ring body, wherein the undercut is provided at the radial outer lateral area of the collar. The opening of the container may be bordered by the collar only. The presence of the gasket may not reduce the accessibility of the inner volume of the container and the filling material inside the container. Further the gasket may be stretched to a larger average diameter for connecting the gasket to the collar. A quite high contact force of the gasket to the radial outer face of the collar may be provided leading to a corresponding tight sealing.

Preferably the collar comprises a front face pointing away from the remaining container, wherein a sealing foil is connected to the front face. The opening may be sealed in addition by means of the sealing foil. The foil may be glued and/or welded to the front face. The container may preferably receive hydrophilic materials and/or hygroscopic materials, for example bleaching powder. The foil may protect the filling material from environmental influences until first use of the filing material so that no humidity may enter the container and contact the filling material. The foil may be made from a metal material, particularly comprising aluminium. Particularly after the disposal of the sealing foil during the first removal of a part of the filling material the gasket may protect the remaining filling material for environmental influences, like humidity.

Particularly preferred the collar comprises a front face pointing away from the remaining container, wherein the ring body comprise a stop face for meeting the front face. The axial relative position of the gasket to the collar can be given by the stop meeting the collar. Thereby the axial relative position of the gasket to the collar is not or not only given by the nose encompassing the undercut of the collar. This allows a relative position of the nose where the nose is pressed against the undercut with a specific contact force by which a sufficient tight sealing is provided.

Particularly the undercut is press fitted between the nose and the stop face. The material of the collar providing the undercut may be clamped between the nose and the stop face. Due to the press fit a high contact force between the gasket and the collar as well as a corresponding tight sealing may be provided.

Preferably the undercut is provided by a groove provided in the collar. The groove may be larger than the nose and particularly provides a clearance fit with the nose so that the nose may be easily inserted into the groove. In the alternate the groove may provide a press fit with the nose so that a sufficient contact force is already provided when the nose is pressed into the groove. One axial side of the groove may provide an axial face of the undercut, wherein the opposite side may block a too large displacement of the gasket with respect to the collar. The base face of the groove may be located spaced to a tip of the nose so that the nose may deform into the groove, if required.

Particularly preferred a material sensitive to the environmental atmosphere, particularly a hygroscopic material, is provided inside the container, wherein particularly the material comprises or consists of a cosmetic product, particularly a bleaching powder. Due to the tight sealing such kind of a filling material may be stored inside the container without the risk that the filling material is affected by environmental influences. For example, an agglomeration of a hygroscopic material due to environmental humidity may be prevented.

Particularly the ring body, the nose and the flap are one-piece for forming the gasket. The gasket may be produced one-piece by injection molding or the like so that it is not necessary to connect different separated parts to one common gasket. The manufacturing costs may be kept low.

Figure 2:
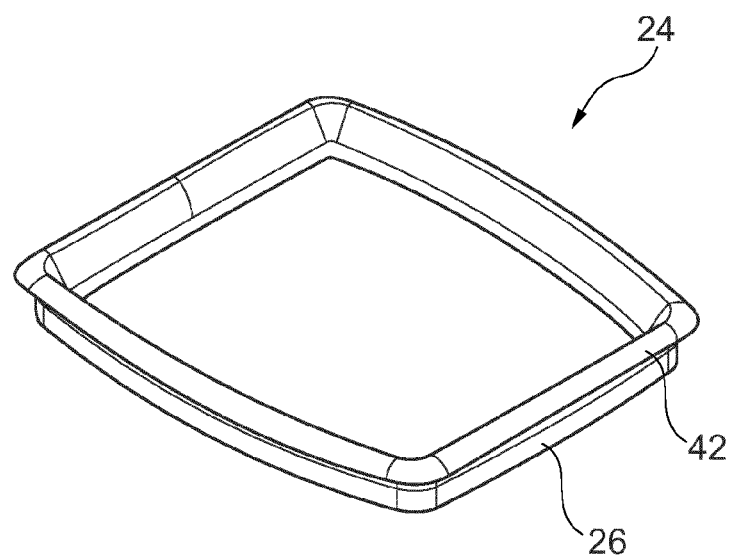
Figure 3:
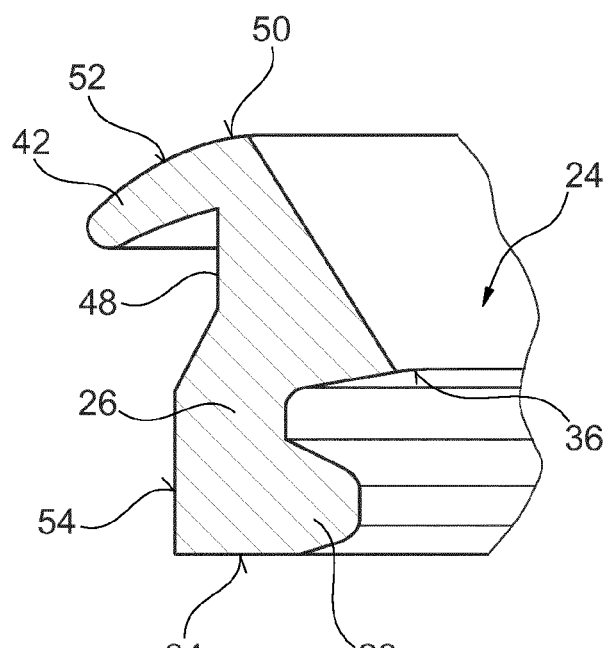
Figure 4:
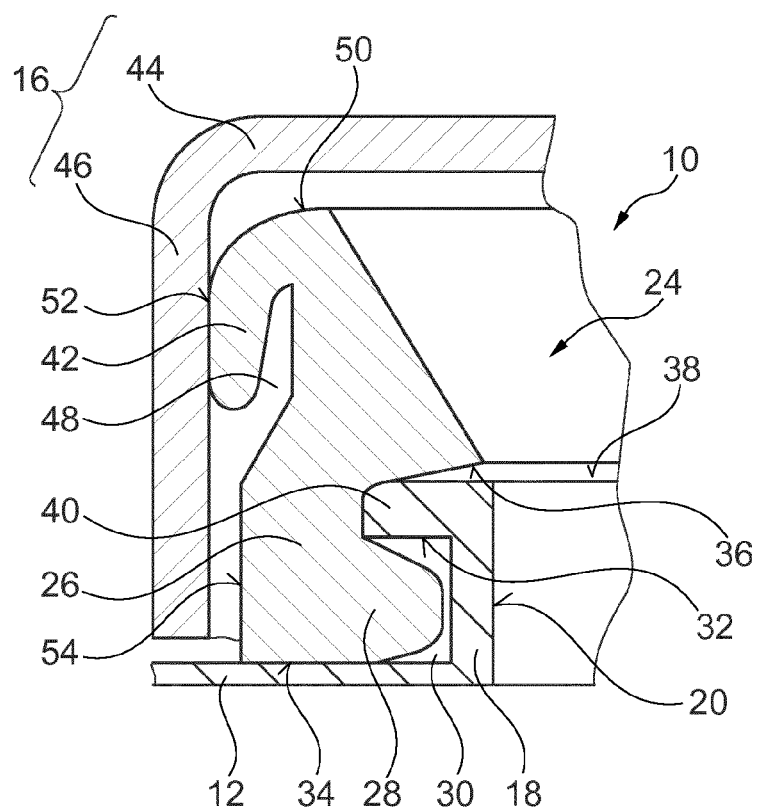
Figure 5:
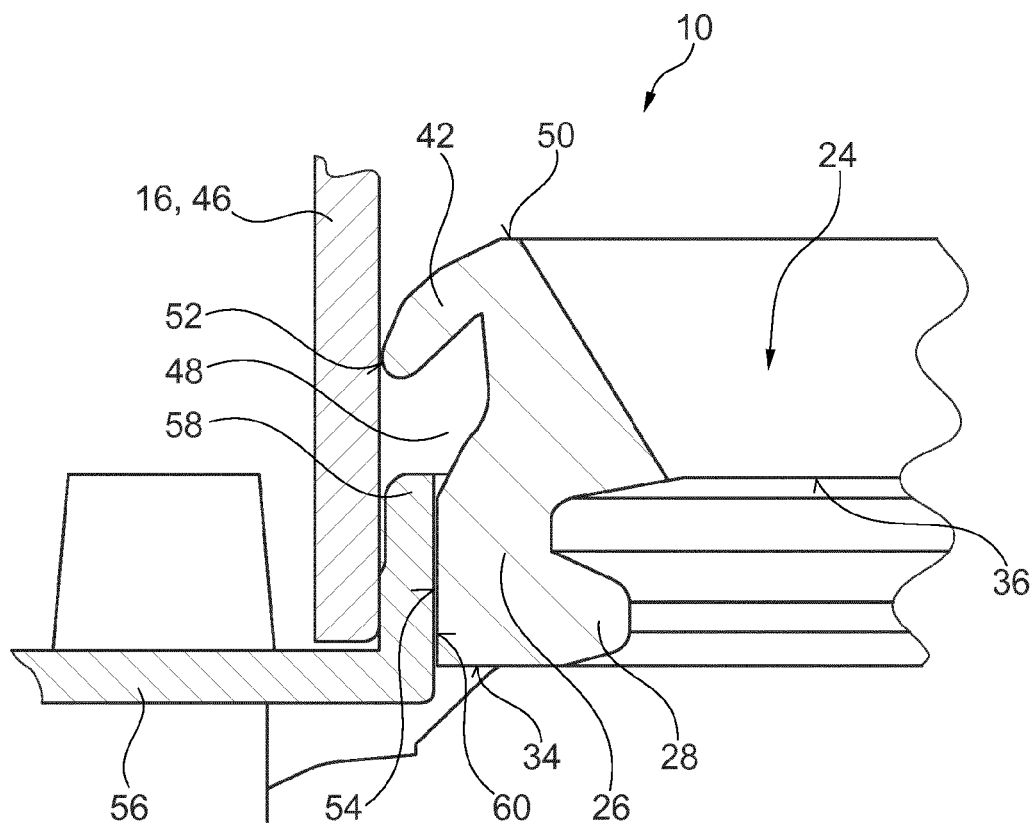

These and other aspects of the invention will be apparent from and elucidated with reference to the embodiments described hereinafter, wherein the described features can constitute each solely or in combination an independent aspect of the invention. In the drawings:

FIG. 1: is a schematic exploded view of a packaging,

FIG. 2: is a schematic perspective view of a gasket of the packaging of FIG. 1,

FIG. 3: is a schematic cross-sectional view of the gasket of FIG. 2,

FIG. 4: is a schematic cross-sectional view of the gasket of FIG. 3 in assembled state of the packaging of FIG. 1 and FIG. 5: is a schematic cross-sectional view of the gasket of FIG. 3 in assembled state of an alternate packaging.

The packaging 10 as illustrated in FIG. 1 comprises a container 12 and a significantly smaller additional compartment 14. The container 12 can be manufactured from polyethylene by blow moulding. The additional compartment 14 can in particular be manufactured from polypropylene by plastic injection moulding. The additional compartment 14 may comprises a spoon for removing a part of the filling material. A lid 16 is connected to the additional compartment 14 via a film hinge. The additional compartment 14 may be connected to the container as described in WO 2009/147194 A2 so that in turn the lid 16 is also connected to the container 12. The container comprises a collar 18 bordering an opening 20 for providing access to the inside of the container 12. The opening 20 may by sealed by means of a metal sealing foil 22 glued to the collar. In addition a gasket 24 as illustrated in FIG. 2 is provided, which may be connected to the collar 18 of the container in a sealing manner and may be pressed against the lid 16 in the closed state of the lid 16 so that the opening 20 may be sufficiently sealed after removing the metal dealing foil 22 for providing access to the filling material the first time.

In the illustrated embodiment the lid 16 and the container 12 are distributed over different parts. In the alternate the lid may be one-piece with the container, wherein particularly the lid 16 is connected to the container via a film hinge. If so, the additional compartment 14 may be omitted or be also one-piece with the container 12 in the alternate embodiment.

The gasket 24 as illustrated in FIG. 2 and FIG. 3 comprises a ring body 26 which can be deformed, particularly stretched, and pressed by means of its resilient force onto the collar. The form of the ring body 26 may correspond mainly to a radial face of the collar 18. In the illustrated embodiment a nose 28 protrudes from the ring body 26 radially inwards for being received into a groove 30 of the collar 18 so that the gasket 24 encompasses an undercut 32 of the collar as illustrated in FIG. 4. The nose 28 transits into a lower front face 34 of the ring body 26. The ring body 26 further comprises a stop face 36 arranged opposite to the nose 28. The stop face 36 may meet a front face 38 of the collar 18 for providing a definite relative axial position of the gasket 24 to the collar 18 and preferably for clamping a protruding rim 40 of the collar 18 between the stop face 36 and the nose 28. The protruding rim 40 provides the undercut 32 of the collar.

A flap 42 protrudes from the ring body 26 particularly radially outwards. The flap 42 transits into an upper front face 50 of the ring body 26. When the lid 16 is closed as illustrated in FIG. 4 the lid 18 may meet a contact area 52 of the flap 42 and bend the flap 42 towards the ring body 26 so that an increasing resilient force is provided by the bent flap 42. In the alternate the contact area 52 may be nearly linear, so that a frictional relative movement of the lid 16 relative to the flap 42 may be reduced. The lid 16 may comprise a top part 44 from which a side wall 46 may protrude for providing a mainly U-shaped cross section. The side wall 46 may aligned orthogonal to the top part 44 or inclined with respect to the top part running towards or particularly away from the collar 18 in the closed state. Particularly the side wall 46 only bends the flap 42. The ring body 26 may comprise a pocket 48 into which the flap 42 may be bent. The contact area 52 of the flap and an outer lateral area 54 of the ring body may or may not arranged mainly flush in the maximum bent state of the flap 42.

As illustrated in FIG. 5 a frame-like closure part 56 may be connected to the container 12. The closure part 56 may comprise a tube part 58 protruding upwards in axial direction. An inner surface 60 of the tube part 58 may press against the ring body 26 of the gasket 24 so that the ring body 26 and/or the nose 28 are pressed against the collar 18 increasing the sealing effect. If so, the side wall 46 of the lid 16 is put onto the tube part 58. The tube part 58 may comprise a chamfer or the like for facilitating the insertion of the tube part 58 into the lid 16. Particularly the lid may be releasably clamped to the closure part, preferably by means of a press fit between the tube part 58 of the closure part 56 and the side wall 46 of the lid 16. In a further embodiment, the gasket 24 may comprise a protruding part protruding radially outwards which can be positioned between the closure part 56 and the front face of the container 12.

The invention claimed is:

1. Packaging for receiving a filling material, the packaging comprising a container for storing the filling material, wherein the container comprises a collar for bordering an opening for providing access to the filling material, wherein the collar comprises an undercut running in circumferential direction, a lid for covering the opening in closed state and a gasket made from an elastic material for sealing the opening, wherein the gasket comprises a ring body for surrounding the opening, a nose protruding mainly radially inwards from the ring body towards the opening, wherein the gasket encompasses the undercut by means of the nose for connecting the gasket to the collar in a sealing manner, and a flap protruding mainly radially outwards from the ring body away from the opening, wherein the flap is adapted to seal the lid in closed state of the lid.

2. Packaging according to claim 1 wherein a closure part surrounding the collar is connected to the container, wherein the gasket is fastened, between the collar and the closure part.

3. Packaging according to claim 1, wherein the flap is bent by the lid in the closed state.

4. Packaging according to claim 3, wherein the ring body comprises a pocket for receiving the flap in the maximum bent state, wherein a contact area of the flap for contacting the lid and an outer lateral area of the ring body outside the pocket are arranged mainly flush in the maximum bent state of the flap.

5. Packaging according to claim 1, wherein a contact area of the flap for contacting the lid transits into an upper front face of the ring body.

6. Packaging according to claim 1, wherein the gasket comprises a hardness (h) in Shore A according to DIN ISO 7619-1:2010 at 23° C. of 5≤h≤90.

7. Packaging according to claim 1, wherein the nose transits into a lower front face of the ring body.

8. Packaging according to claim 1, wherein the undercut is provided at the radial outer lateral area of the collar.

9. Packaging according to claim 1, wherein the collar comprises a front face pointing away from the remaining container, wherein a sealing foil is connected to the front face.

10. Packaging according to claim 1, wherein the collar comprises a front face pointing away from the remaining container (12), wherein the ring body comprises a stop face for meeting the front face.

11. Packaging according to claim 10, wherein the undercut is press fitted between the nose and the stop face.

12. Packaging according to claim 1, wherein the undercut is provided by a groove provided in the collar.

13. Packaging according to claim 1, wherein a hygroscopic material is provided inside the container, wherein the material comprises or consists of a bleaching powder.

14. Packaging according to claim 1, wherein the ring body, the nose and the flap are a single piece for forming the gasket.

15. Packaging according to claim 1, wherein the flap protrudes from the ring body mainly in an unstressed and/or relaxed manner in the opened state of the container, wherein the sealing force between the lid and the flap is provided by bending the flap while the lid is moved into the closed state.

16. Packaging for receiving a filling material, the packaging comprising a container for storing the filling material, wherein the container comprises a collar for bordering an opening for providing access to the filling material, wherein the collar comprises an undercut running in circumferential direction, a lid for covering the opening in closed state and a gasket made from an elastic material for sealing the opening, wherein the gasket comprises a ring body for surrounding the opening, a nose protruding mainly radially from the ring body, wherein the gasket encompasses the undercut by means of the nose for connecting the gasket to the collar in a sealing manner, a flap protruding mainly radially from the ring body, wherein the flap is adapted to seal the lid in closed state of the lid, wherein the flap protrudes mainly radially outwards from the ring body, wherein the flap is bent by the lid in the closed state, and wherein the ring body comprises a pocket for receiving the flap in the maximum bent state, wherein a contact area of the flap for contacting the lid and an outer lateral area of the ring body outside the pocket are arranged mainly flush in the maximum bent state of the flap.

* * * * *